United States Patent
Zhou et al.

(10) Patent No.: US 10,713,262 B2
(45) Date of Patent: *Jul. 14, 2020

(54) COMBINED ONLINE AND OFFLINE RANKING FOR SEARCH RESULTS

(71) Applicant: A9.com, Inc., Palo Alto, CA (US)

(72) Inventors: Yue Zhou, Sunnyvale, CA (US); Francois Huet, Santa Cruz, CA (US)

(73) Assignee: A9.com, Inc., Palo Alto, CA (US)

( * ) Notice: Subject to any disclaimer, the term of this patent is extended or adjusted under 35 U.S.C. 154(b) by 932 days.

This patent is subject to a terminal disclaimer.

(21) Appl. No.: 15/335,255

(22) Filed: Oct. 26, 2016

(65) Prior Publication Data
US 2017/0046347 A1    Feb. 16, 2017

Related U.S. Application Data

(63) Continuation of application No. 14/697,124, filed on Apr. 27, 2015, now Pat. No. 9,483,531, which is a continuation of application No. 13/596,478, filed on Aug. 28, 2012, now Pat. No. 9,020,866.

(51) Int. Cl.
| | |
|---|---|
| *G06F 16/2457* | (2019.01) |
| *G06N 20/00* | (2019.01) |
| *G06F 16/248* | (2019.01) |
| *G06F 16/951* | (2019.01) |
| *G06Q 30/06* | (2012.01) |

(52) U.S. Cl.
CPC ...... *G06F 16/24578* (2019.01); *G06F 16/248* (2019.01); *G06F 16/951* (2019.01); *G06N 20/00* (2019.01); *G06Q 30/0625* (2013.01)

(58) Field of Classification Search
None
See application file for complete search history.

(56) References Cited

U.S. PATENT DOCUMENTS 7,624,020 B2 * 11/2009 Yamada ............. G06F 17/2809
                                                          704/237

* cited by examiner

*Primary Examiner* — Li Wu Chang
(74) *Attorney, Agent, or Firm* — Hogan Lovells US LLP (57) ABSTRACT

Approaches are described for ranking multiple products or other items, such as products obtained in response to a search request submitted to a server. The ranking system determines a ranking score for the products based on both data available online and item data that must be computed offline due to longer computation time or unavailability of data. The ranking score can be used to rank the products and determine which products are the most relevant to the user. A hybrid boosting method is used to first train an online ranking function to produce an online ranking score for the item. In the second phase, an offline ranking function is trained to produce a second ranking score for the item. The online rank score is combined with the offline rank score at query time to produce a combined rank for the items in the search results.

20 Claims, 7 Drawing Sheets

COMBINED ONLINE AND OFFLINE RANKING FOR SEARCH RESULTS

RELATED APPLICATIONS

This application is a continuation of allowed U.S. application Ser. No. 14/697,124, entitled "COMBINED ONLINE AND OFFLINE RANKING," filed Apr. 27, 2015, which is a continuation of U.S. Pat. No. 9,020,866 issued on Apr. 28, 2015; of which the full disclosure of these applications are incorporated herein by reference for all purposes.

BACKGROUND

Many of today's search engine services, such as Google, Yahoo and Overture, allow users to search for information that is accessible over the Internet. These search engine services allow users to search for web pages and other Internet-accessible resources that may be of interest to the users. Typically a user submits a search query to the search engine and the search engine returns a set of web pages to the user. The user then clicks on a link and is taken to the selected website.

In the context of electronic commerce (e-commerce), search engines often perform searches for products based on the user's query. For example, once the user has navigated to a particular merchant's website, they may search for a particular product. The search service would then identify the relevant products and display them to the user. It is often useful to rank the products in a particular order in an attempt to display the most relevant product first followed by less relevant products. As no such ranking function is absolutely perfect, it is also desirable to minimize the error of the ranking to the lowest amount possible.

BRIEF DESCRIPTION OF THE DRAWINGS

Various embodiments in accordance with the present disclosure will be described with reference to the drawings, in which.

DETAILED DESCRIPTION

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the foregoing or other deficiencies experienced in conventional approaches for ranking data items. In particular, various embodiments can provide approaches for ranking multiple products, such as products obtained in response to a search request submitted to a search server. The ranking system determines a ranking score for the products based on both (1) item data available online (e.g., index data, data that can be computed in real-time in response to a search query, etc.); and (2) item data that is obtained offline (e.g., percentage of total product sales, derived features, etc.) due to longer computation time or unavailability of data. The ranking score can be used to rank the products and determine which products are the most relevant to the user.

In many cases, given a product family, it is desirable to select a product that is the most relevant or best represents the family. For example, if a user submits a search for a particular book, there are often several editions of the same book (e.g., hardback, paperback, audiobook, Kindle edition, etc.) and it may be important to select an edition that is most relevant to the user in the context of the query. One way to select the edition is to assign a ranking score to each of the editions of the book and use the ranking score to select between the different editions.

In various embodiments, two types of features (e.g., item data) are needed in the ranking process. The first type is the online features, which are stored in a data structure suitable for querying, such as a search index, or which can be computed at query time within a time period that is deemed suitable for responding to the query. The second type is the offline features, which are not stored in the search index or which cannot be computed in time reasonable to satisfy a search request. The offline features are calculated and combined offline into one or more summary features. The summary features are stored in the data structure suitable for querying, but the offline features don't have to be. Online features can offer more flexibility because they can be updated independently and therefore possibly faster than offline features. They can however be more costly in terms of space requirements in the query-time data structure, and in terms of computation time when determining results ordering at query time. Offline features can combine complex separate features that may be impractical to combine at query time, and summarize them for efficient integration into results ordering at query time. They may contain richer information, but cannot be updated independently. Conventionally, there has been no straightforward way to utilize both the online and offline features seamlessly in a single rank function, whether it is machine learned or hand crafted.

In accordance with an embodiment, the ranking process uses a hybrid two-phase boosting method. In the first phase, a decision tree boosting algorithm is used to train an online rank function, which only uses online features. In the second phase the same algorithm is used to train an offline rank function, with both online and offline features. In various embodiments, the above-mentioned order can be reverted, i.e. by first training the offline model and then training the online model. Because the boosting algorithm is a generalized additive model (GAM), the training order does not affect the order when applying the model, i.e. the online and offline models can be calculated in arbitrary order due to the commutative property of addition. The offline rank function is trained using the same training target as the online rank function, with the online ranking score as the offset to training target. Since the boosting algorithm is a general additive model, the online/offline rank function can be combined in real-time without much additional computation. The online rank function can be applied in query time and reflects real-time feature value change although its ranking accuracy is not perfect due to the limited online feature set. In contrast, the offline rank function has better rank accuracy but is slow to feature value change. It should be noted that a number of boosting methods are known in the art. For example, in one embodiment, the gradient boosting algorithm can be used to combine the online training function and the offline training function. In alternative embodiments, other boosting algorithms can be used to combine the two or more weak functions to produce a stronger ranking score for an item.

In accordance with an embodiment, an offline ranking score can be periodically computed (e.g., several times per day) for each item in a family of items. This offline ranking score can be stored in an index associated with the item, wherein the index is accessible at query time. When a search request is received from a user, the search system can parse the query and execute it to obtain a set of search results (e.g., a family of products). At this time, the ranking component dynamically computes an online ranking score for the item in response to the search request, wherein the online rank score is based at least in part on online features. The computed online ranking score is then combined with the offline ranking score retrieved from the index in order to rank each item in the search results. For example, the online rank score can be combined with the offline rank score to get a final rank score for the item in the context of the query.

A number of advantages can be obtained by using such a hybrid rank function. For example, the online/offline ranking functions jointly optimize the loss function to the ranking target, which can improve relevance ranking, in addition to various other ranking problems, under a unified framework. Furthermore, the hybrid rank function preserves the strength of both online and offline features. Because of the online component, the hybrid function can quickly respond to real-time feature value change. At the same time, because of the offline component, the hybrid function can achieve better ranking accuracy then merely using the online features.

Figure 1:
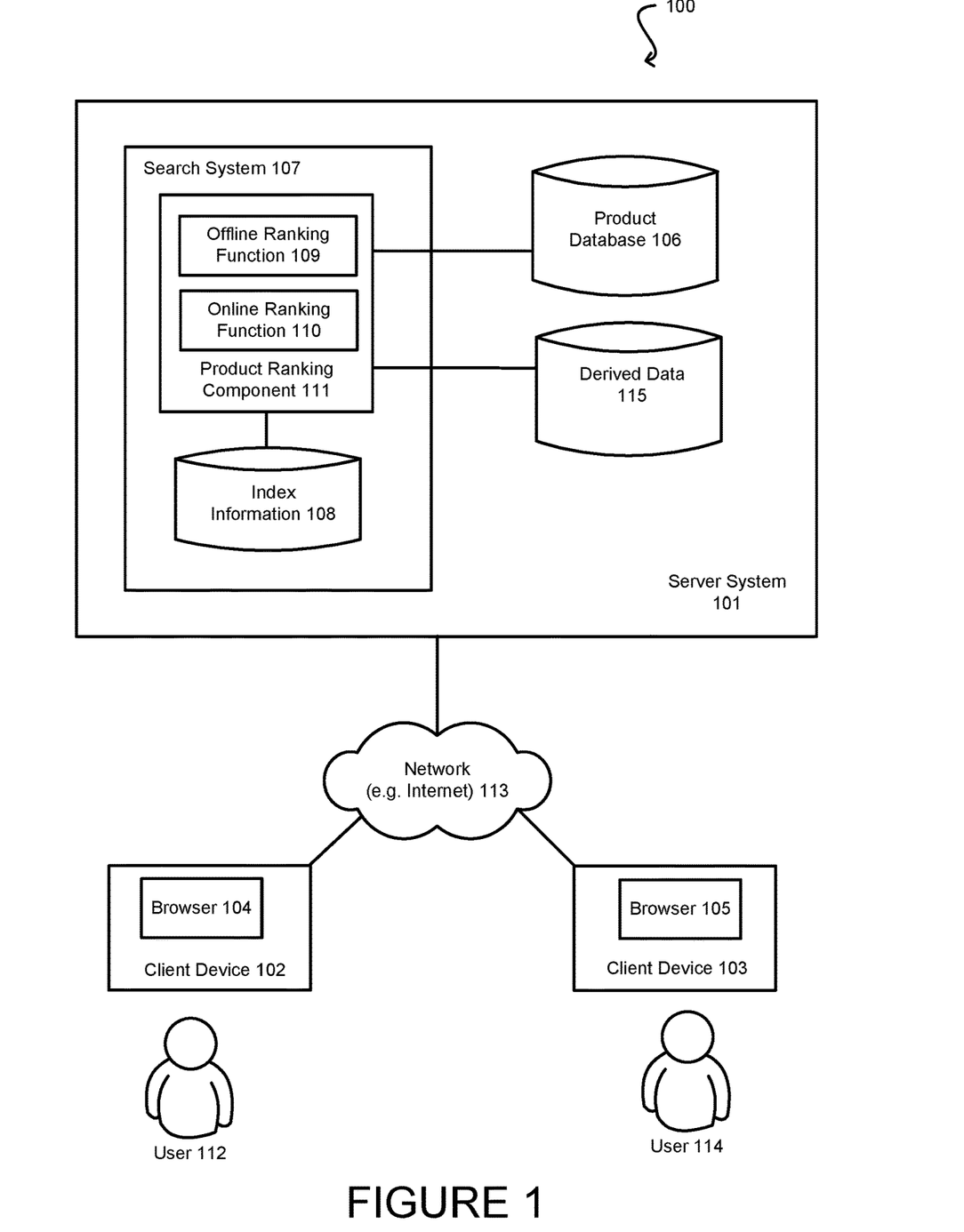
FIG. 1 illustrates an example of the combined offline and online ranking functions being utilized in a search engine environment, in accordance with various embodiments.

FIG. 1 illustrates an example 100 of the combined offline and online ranking functions being utilized in a search engine environment, in accordance with various embodiments. In the illustrated embodiment, the combined ranking functions are implemented in a search system 107 (e.g., a product search engine) of a server system 101 or other computing environment that is accessible over a network 113. As used throughout this disclosure, a network can be any wired or wireless network of devices that are capable of communicating with each other, including but not limited to the Internet or other Wide Area Networks (WANs), cellular networks, Local Area Networks (LANs), Storage Area Networks (SANs), Intranets, Extranets, and the like. The server 101 can be one or more servers, such as Web servers or application servers that enable various clients (102, 103) to access the search system 107. The client devices (102, 103) can be any computing device, including but not limited to personal computers (PCs), laptops, tablet computers, mobile phones, and the like. In some embodiments, the client devices include a browser (104, 105), such as Internet Explorer, Mozilla Firefox, Safari, Google Chrome and the like. The client devices can be used by users (112, 114) that access the search system 107 to search for various products in the product database 106, compare between them and/or purchase the products electronically.

In accordance with an embodiment, the search system 107 includes a ranking component 111 that divides the ranking function into two parts, an offline ranking function 109 and an online ranking function 110. One reason, among others, for dividing the ranking function in this manner is due to the fact that not all of the data useful for ranking the products may be practical to store and compute in an index that is accessible at query time. For example, it might be impractical to store large numbers of features in the index, because storage space can be an issue. This type of data is often not suitable for calculating the ranking score in real time (at query time). Another reason is related to the efficiency of the ranking algorithm. For online ranking, the algorithm typically needs to be optimized for efficiency because latency is very important at fulfilling queries in real time. For example, if the ranking algorithm is highly sophisticated and involves complex computation, it could introduce latency that would be unacceptable at query time (e.g., users would find it frustrating to wait for the search query to be executed). As such, the combined approach can ship the more complex and sophisticated calculations to the offline ranking function, for which latency is less important.

In accordance with an embodiment, a hybrid two-phase boosting method is used to train the offline and online ranking functions. A boosting method is a generic additive learning method that can be used to train the ranking model. The boosting method can be used to combine different classification or regression algorithms under a general additive framework. Assuming there are two regression models for ranking (online and offline), the boosting method can be used to train the two models based on one another and combine them together without heavy computation overhead. In accordance with one embodiment, the particular algorithm used to train the functions is the gradient boost method and the particular ranking function used is a decision tree model. In alternative embodiments, however, various other boosting methods and ranking functions can be used within the scope of the disclosure presented herein.

In accordance with an embodiment, in the first phase, the online model is trained first, which only uses the features available online (e.g., data available in the index accessible at query time). From this, a regression model is obtained which can be applied in real-time online but whose ranking accuracy is not perfect due to the limited data that is available online. The error will then be estimated on the training data. The error can be estimated by a loss function between the training target and the ranking score generated by the online function (or offline function, in the case where the offline function is trained first). The loss function is user-definable, such as the ranking score subtracted from the training target or any other form suitable to represent the error. In our particular implementation, the logistic loss function is used to evaluate the divergence between training target and rank function. The estimated error is then used to train the offline model under a boosting framework. Thus, once the online model is trained, in the second phase, the offline model is trained using both online and offline data in an effort to improve the accuracy and minimize the training error of the online ranking model. The offline model can be trained using the same algorithm as the online model and using the online ranking score as the offset to the training target. As such, the offline ranking function is trained based on the training error of the online rank function in order to minimize the error. It should be noted that in alternative embodiments, the training of the two models can also be reversed, i.e. by first training the offline model and then training the online model.

In accordance with an embodiment, once the ranking functions are trained in the manner described above, the offline ranking function 109 can periodically compute an offline rank score for each item (e.g., several times per day) and store the offline rank score into an index 108 that will be available at query time. This offline rank score can be computed using all available data (online and offline data) and by using as sophisticated of algorithms as desired. Then at query time, upon receiving a search request from the user (112 114), the online ranking function 110 computes an online rank score for the item using only online data (e.g., data available from the index or computed in real-time). This online rank score is then combined (e.g., added, etc.) with the offline rank score retrieved from the index in order to derive a final rank score for the item. This combining of the online and offline computation enables the ranking system to use more complex and data-rich ranking algorithms, while at the same time still being highly responsive to value changes in the data that may be occurring in real-time.

Figure 2:
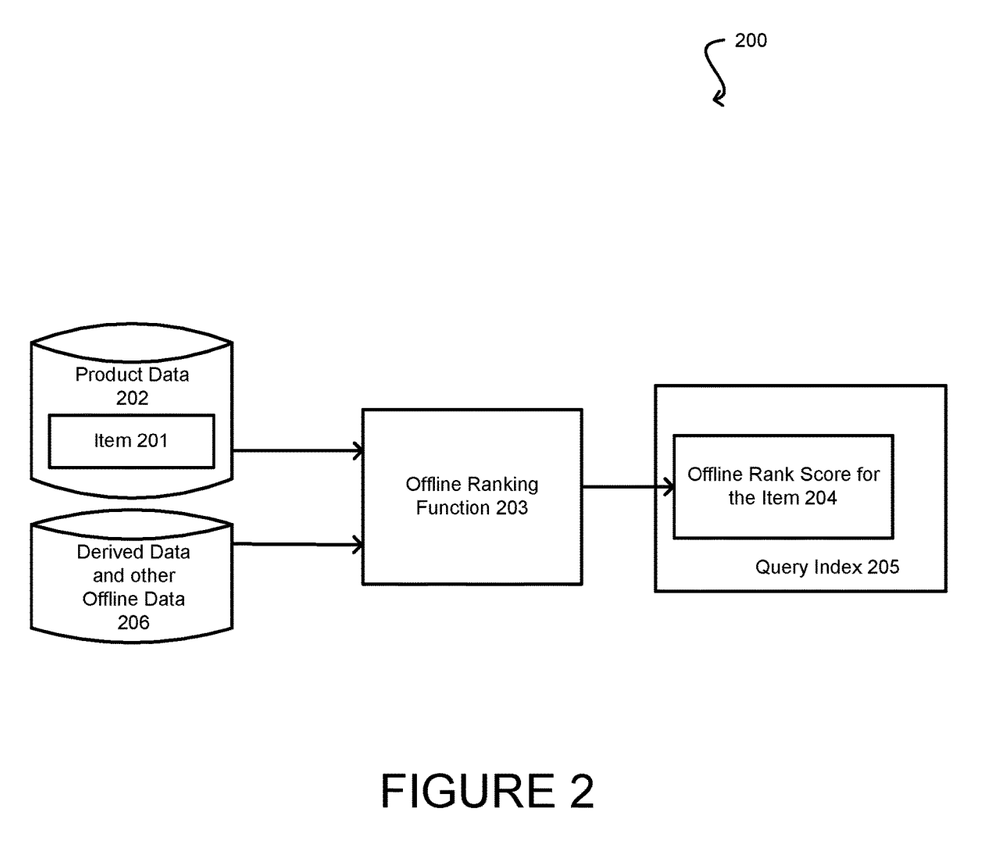
FIG. 2 illustrates an example of the offline ranking function that computes an offline rank score for data items, in accordance with various embodiments.

FIG. 2 illustrates an example 200 of the offline ranking function that computes an offline rank score for data items, in accordance with various embodiments. In the illustrated embodiment, the offline ranking function 203 can utilize all available product data 202, as well as derived data 206 to compute an offline rank score for the item 201. In addition, the offline rank function 203 can use sophisticated algorithms that require substantial processing time that would not normally be deemed acceptable during the processing of each query. For offline computing, even a considerable amount of latency and storage space may be acceptable because the offline rank score is only computed periodically rather than on-the-fly.

Figure 3:
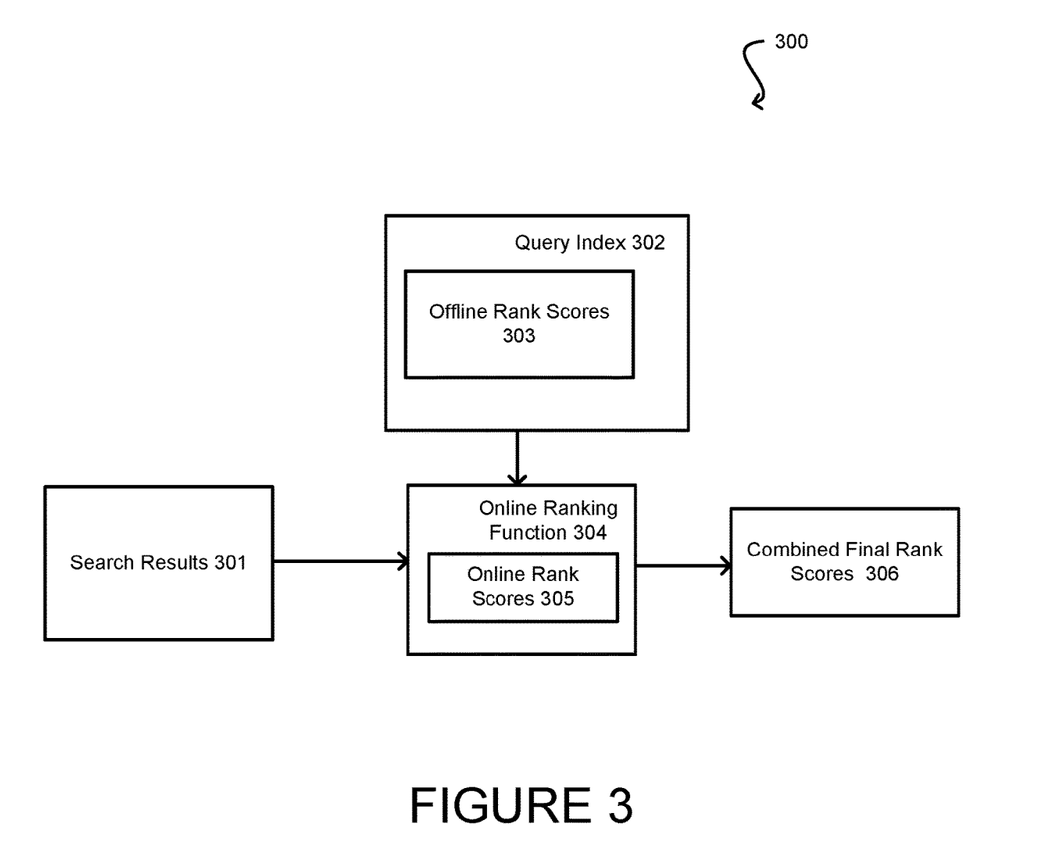
FIG. 3 illustrates an example of the online ranking function that computes an online rank score for data items, in accordance with various embodiments.

FIG. 3 illustrates an example 300 of the online ranking function that computes an online rank score for data items, in accordance with various embodiments. In the illustrated embodiment, the online ranking function 304 can be invoked at query time, i.e., upon receiving a search request from the user. The query can be parsed and executed by the search engine using any number of search algorithms and techniques well known in the art. Once a set of search results 301 is obtained, the online ranking function can compute an online rank score 305 for each of the items in the search results. These rank scores 305 can be based only on data that is available online or can be computed on the fly with sufficiently low latency to allow a prompt response to the user. When deciding whether a feature can be computed online or should be computed offline, some determinations can be made to optimize the ranking. For example, the potential latency caused by the computation can be analyzed and/or compared to a particular predetermined threshold (e.g., 1 second or less) to determine whether it is feasible to compute the feature dynamically at query time. Similarly, the storage space needed to store a particular feature in the search index can be a factor in determining whether to make a particular feature an online feature or an offline feature. For example, if storing the feature into the search index would require a substantial amount of storage space, it may be deemed to be more efficient to designate the feature an offline feature which is used by the offline ranking function.

In accordance with an embodiment, the online ranking function 304 also retrieves the offline rank score 303 from the query index 302 for each item in the search results 301. The offline rank score 303 is then combined with the computed online rank score 305 to produce a final combined rank score 306 for each item in the search results. The combination of online and offline model is based on the boosting algorithm which uses a general linear equation to achieve better precision. Once the final rank scores are determined, the search engine can order the search results according to their rankings, present the most relevant result to the user and implement the ranking scores in various other ways.

Figure 4:
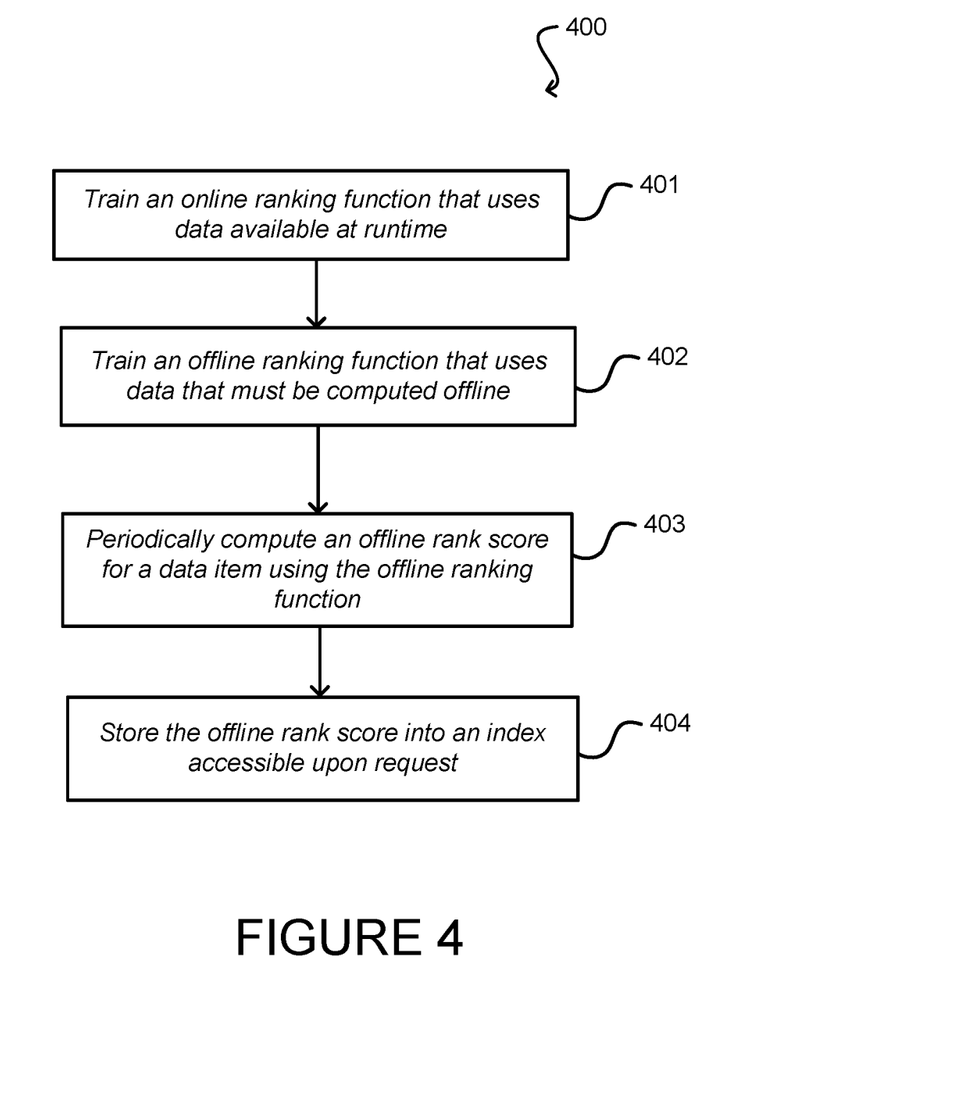
FIG. 4 illustrates an example process for training the online and offline ranking functions, in accordance with various embodiments.

FIG. 4 illustrates an example process 400 for training the online and offline ranking functions, in accordance with various embodiments. Although this figure, as well as any other process illustrations contained in this disclosure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

In operation 401, the ranking system trains an online ranking function which uses only online features, such as features available in the query index. For example, the algorithm used to train the online ranking function can be the gradient boost method and the ranking function that can be used is a decision tree model.

In operation 402, the ranking system trains the offline ranking function which can use both online and offline features. The same algorithm (e.g., decision tree algorithm) can be used to train the offline ranking function as the online ranking function. The offline rank function must be trained using the same training target (e.g., data point label) as the online rank function, with the online ranking score as the offset to training target.

In operation 403, the offline ranking function periodically computes an offline rank score. For example, the offline rank score can be computed several times per day. The offline rank score is computed using any available data, including both online data that is stored in the query index and offline data that is not available in real time and/or needs to be computed separately.

In operation 404, the offline ranking function stores the offline rank score into the query index. As used throughout this disclosure an index can be any data structure or container used by the search engine to facilitate faster information retrieval. Information is typically stored in the index in order to optimize speed and performance in finding relevant documents for a search query. Maintaining information in the index increases the additional computer storage that is required, as well as the time required for an update to take place, and these increases are traded off for the time saved during information retrieval (e.g., during execution of a search query). For example, by storing the offline rank score into the index, the search system makes the ranking score readily available at query time at the cost of slightly increasing the size of the index.

Figure 5:
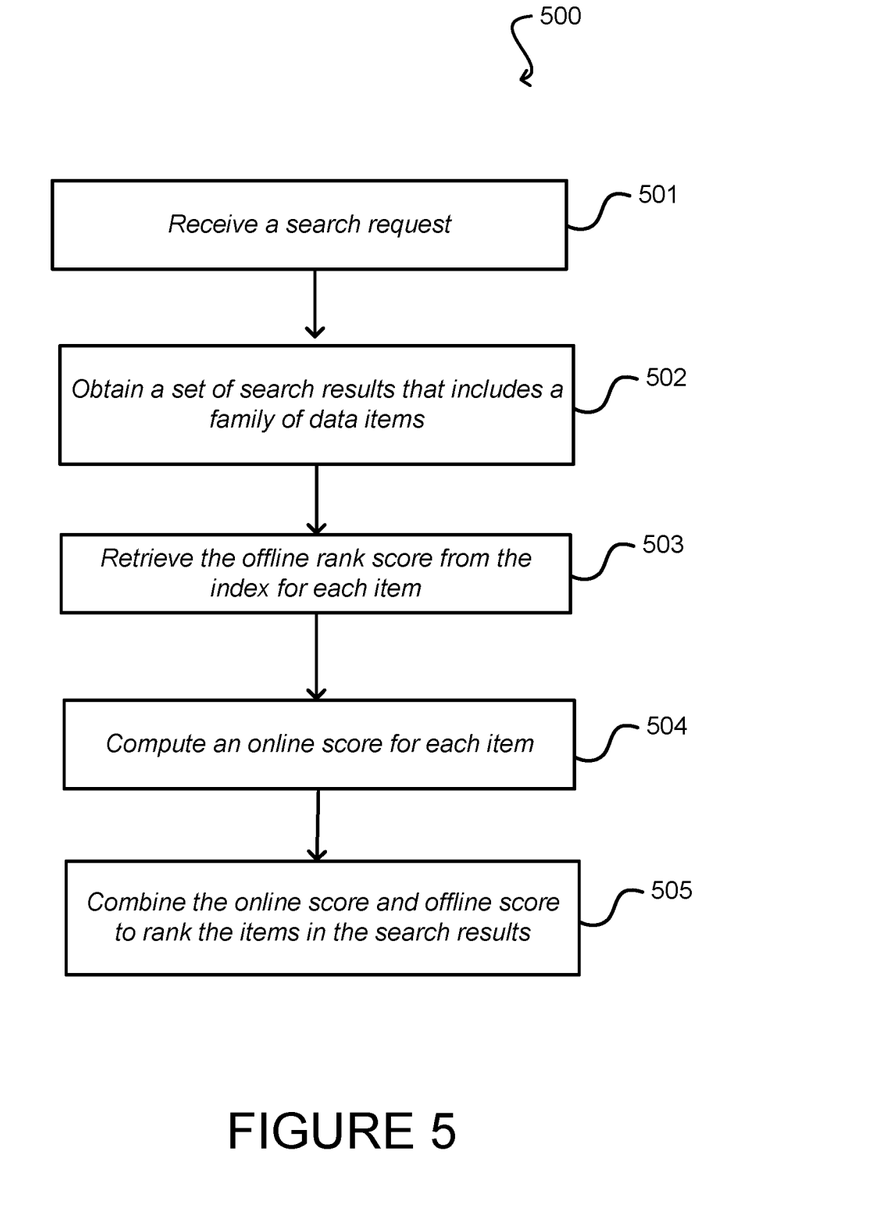
FIG. 5 illustrates an example of the execution of the ranking system at query time, in accordance with various embodiments.

FIG. 5 illustrates an example 500 of the execution of the ranking system at query time, in accordance with various embodiments.

In operation 501, the search system receives a search request. For example, the search request may be submitted by a user entering a search query into a search engine on an online merchant's website. In operation 502, the search engine parses the query and executes the search to obtain a set of search results. The search results may include a number of items and products that match the search query entered by the user. In accordance with an embodiment, the search system ranks the search results by utilizing the combined offline and online ranking functions as described herein.

In operation 503, the ranking system retrieves the offline ranking score for each item in the search results. The offline ranking score is periodically computed by the offline ranking function, as previously described. In operation 504, the ranking system computes an online ranking score for the items in the search results. The online ranking score determination can be done in real time, in response to the search request. In operation 505, the offline rank score and the online rank score are combined to produce a final ranking of each item in the search results. In accordance with an embodiment, this final ranking is used to determine which items are most relevant to the user given the context of the search query and to present those items in prioritized order.

Figure 6:
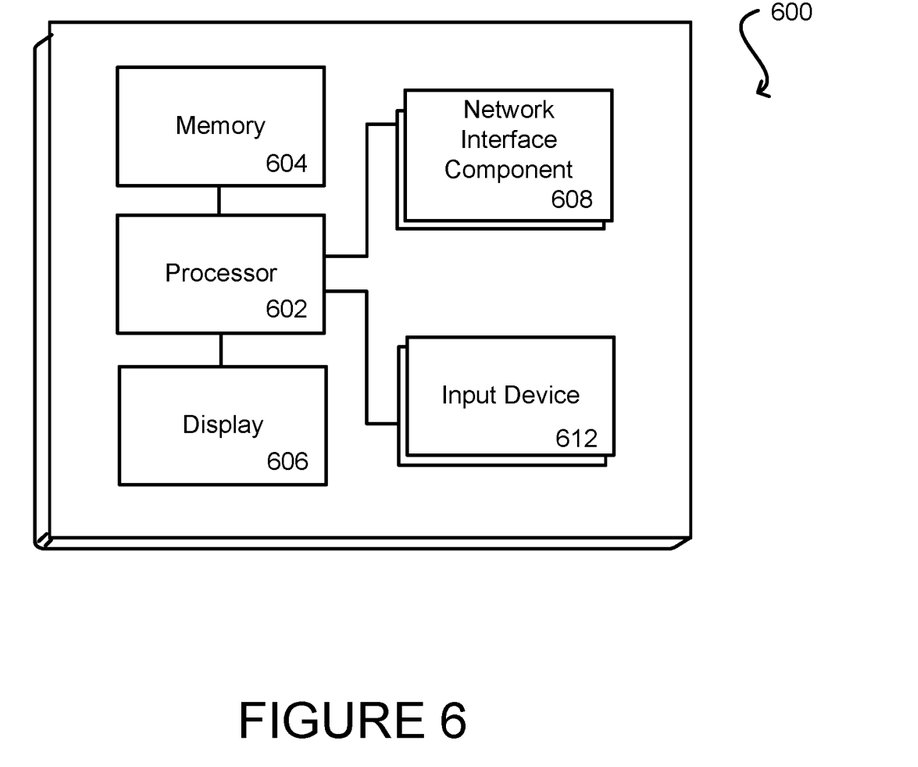
FIG. 6 illustrates a logical arrangement of a set of general components of an example computing device that can be utilized in accordance with various embodiments.

FIG. 6 illustrates a logical arrangement of a set of general components of an example computing device 600. In this example, the device includes a processor 602 for executing instructions that can be stored in a memory device or element 604. As would be apparent to one of ordinary skill in the art, the device can include many types of memory, data storage, or non-transitory computer-readable storage media, such as a first data storage for program instructions for execution by the processor 602, a separate storage for images or data, a removable memory for sharing information with other devices, etc. The device typically will include some type of display element 606, such as a touch screen or liquid crystal display (LCD), although devices such as portable media players might convey information via other means, such as through audio speakers. As discussed, the device in many embodiments will include at least one input element 608 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 600 of FIG. 6 can include one or more network interface elements 608 for communicating over various networks, such as a Wi-Fi, Bluetooth, RF, wired, or wireless communication systems. The device in many embodiments can communicate with a network, such as the Internet, and may be able to communicate with other such devices.

Figure 7:
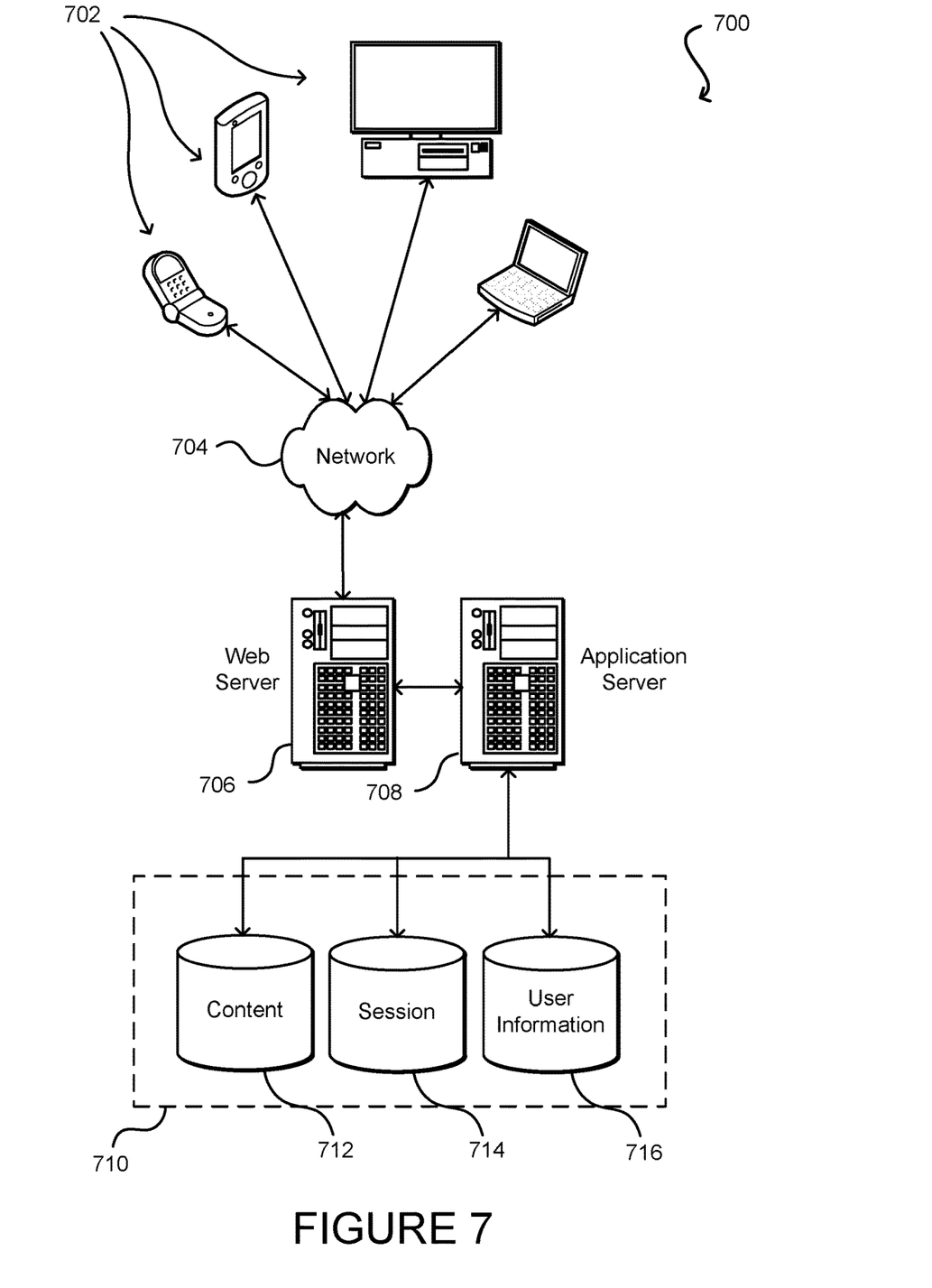
FIG. 7 illustrates an example of an environment for implementing aspects in accordance with various embodiments.

As discussed, different approaches can be implemented in various environments in accordance with the described embodiments. For example, FIG. 7 illustrates an example of an environment 700 for implementing aspects in accordance with various embodiments. As will be appreciated, although a Web-based environment is used for purposes of explanation, different environments may be used, as appropriate, to implement various embodiments. The system includes an electronic client device 702, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 706 for receiving requests and serving content in response thereto, although for other networks an alternative device serving a similar purpose could be used, as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 702 and the application server 708, can be handled by the Web server 706. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log or session data 714. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
   at least one processor; and
   memory including instructions that, when executed by the processor, cause the system to:
   train a first ranking function, the first ranking function generating a respective first ranking score for at least one of a set of items using a set of online data;
   train a second ranking function using the respective first ranking score for the at least one of the set of items, the second ranking function generating a respective second ranking score for at least one of the set of items using the set of online data and a set of offline data;
   generate a respective ranking score for each search result of a set of search results determined in response to a received search query, the respective ranking score being based at least in part upon a respective first score determined using the first ranking function and a respective second score determined using the second ranking function; and
   provide at least a subset of the set of search results ordered by the respective ranking score for each search result.

2. The system of claim 1, wherein the instructions when executed further cause the system to:
   generate a search index comprising the set of online data in response to the set of search results being determined; and
   train the first ranking function using the set of online data from the search index.

3. The system of claim 2, wherein the instructions when executed further cause the system to:
   train the second ranking function using the set of offline data and the respective first score, the set of offline data including data not contained in the search index.

4. The system of claim 1, wherein the set of search results correspond to products in a database of products accessible on a network, and wherein the respective ranking score is generated to determine a relevance of a respective product among the set of search results in a context of the search query.

5. The system of claim 1, wherein the first ranking function and the second ranking function are trained using a training target and wherein the second ranking function is trained with the respective first score as an offset to the training target.

6. The system of claim 1, wherein the respective second score is based at least in part on data that cannot be computed within a predetermined threshold computation time in response to the search request.

7. The system of claim 1, wherein the first ranking function and the second ranking function are trained using a boosting algorithm, the boosting algorithm being one of a gradient boosting algorithm or a decision tree boosting algorithm.

8. A computing device, comprising:
   at least one processor; and
   memory including instructions that, when executed by the processor, cause the computing device to:
   train an online ranking function, the online ranking function generating a respective first ranking score for at least one of a set of items using a set of online data;
   train an offline ranking function using the respective first ranking score for the at least one of the set of items, the offline ranking function generating a respective second ranking score for at least one of the set of items using the set of online data and a set of offline data;
   generate a respective ranking score for each search result of a set of search results determined in response to a received search query, the respective ranking score being based at least in part upon a respective first score determined using the first ranking function and a respective second score determined using the second ranking function; and
   provide a subset of the search results ordered by the respective ranking score for each of the search results.

9. The computing device of claim 8, wherein the items are products offered through an electronic catalog, and wherein the instructions when executed further cause the computing device to:
   dynamically generate the respective first ranking score using data stored in an online search index, the data including at least description data for each of the items as extracted from the electronic catalog.

10. The computing device of claim 8, wherein the items are products offered through an electronic catalog, and wherein the instructions when executed further cause the computing device to:
    periodically generate the respective second ranking score using first data stored in an online search index and second data stored in at least one electronic repository, the first data including at least description data for the items extracted from the electronic catalog, the second data including data that is not available in the online search index.

11. The computing device of claim 8, further comprising:
    storing the second ranking score for the at least one of the set of items in the online search index.

12. The computing device of claim 8, wherein the first ranking function and the second ranking function are trained using a boosting algorithm, the boosting algorithm being one of a gradient boosting algorithm or a decision tree boosting algorithm.

13. A computer implemented method, comprising:
    training a first ranking function, the first ranking function generating a respective first ranking score for at least one of a set of items based on online data;
    training a second ranking function using the respective first ranking score for the at least one of the set of items, the second ranking function generating a respective second ranking score for at least one of the set of items using the online data and offline data; and
    generating a respective ranking score for each search result of a set of search results determined in response to a received search query, the respective ranking score being based at least in part upon a respective first score determined using the first ranking function and a respective second score determined using the second ranking function; and
    providing a subset of the search results ordered by the respective ranking score for each of the search results.

14. The computer implemented method of claim 13, further comprising:
    generating a search index comprising the online data in response to the set of search results being determined; and
    training the first ranking function using the online data from the search index.

15. The computer implemented method of claim 14, further comprising:

training the second ranking function using the offline data and the respective first score for each search result, the offline data including data not contained in the search index.

16. The computer implemented method of claim 13, wherein the search results correspond to products in a database of products accessible on a network, and wherein the respective ranking score is generated to determine a relevance of a respective product among the search results in a context of the search query.

17. The computer implemented method of claim 13, wherein the respective first score is combined with the respective second score to generate the respective ranking score based at least in part on the training of the first and second ranking functions.

18. The computer implemented method of claim 13, wherein the first ranking function and the second ranking function are trained using a training target and wherein the second ranking function is trained with the respective first score as an offset to the training target.

19. The computer implemented method of claim 13, wherein the respective second score is based at least in part on data that cannot be computed within a predetermined threshold computation time in response to the search request.

20. The computer implemented method of claim 13, wherein the first ranking function and the second ranking function are trained using a boosting algorithm, the boosting algorithm including one of a gradient boosting algorithm or a decision tree boosting algorithm.

\* \* \* \* \*